United States Patent
Yang et al.

(10) Patent No.: US 12,212,486 B2
(45) Date of Patent: Jan. 28, 2025

(54) MULTI-HOST LINK AGGREGATION FOR ACTIVE-ACTIVE CLUSTER

(71) Applicant: DELL PRODUCTS L.P., Round Rock, TX (US)

(72) Inventors: Jianfei Yang, Sichuan (CN); Mingyi Luo, Sichuan (CN); Weilan Pu, Sichuan (CN); Srinivasa Raju Chamarthy, Bangalore (IN); Lifeng Zheng, Jinjiang district (CN)

(73) Assignee: DELL PRODUCTS L.P., Round Rock, TX (US)

( * ) Notice: Subject to any disclaimer, the term of this patent is extended or adjusted under 35 U.S.C. 154(b) by 89 days.

(21) Appl. No.: 18/308,600

(22) Filed: Apr. 27, 2023

(65) Prior Publication Data
US 2024/0364622 A1    Oct. 31, 2024

(51) Int. Cl.
*G06F 15/173* (2006.01)
*H04L 45/24* (2022.01)
*H04L 61/2596* (2022.01)
*H04L 101/668* (2022.01)

(52) U.S. Cl.
CPC ........ *H04L 45/245* (2013.01); *H04L 61/2596* (2013.01); *H04L 2101/668* (2022.05)

(58) Field of Classification Search
CPC ............... H04L 45/245; H04L 61/2596; H04L 2101/668
See application file for complete search history.

(56) References Cited

PUBLICATIONS

"IEEE Standard for Local and Metropolitan Area Networks—Link Aggregation," IEEE Computer Society, 2020, [online], [Retrieved Apr. 19, 2024]. Retrieved from Internet <URL:https://ieeexplore.ieee.org/document/9105034> (333pgs).
Amendment to Carrier Sense Multiple Access with Collision Detection (CSMA/CD) Access Method and Physical Layer Specifications—Aggregation of Multiple Link Segments, IEEE-SA Standards Board, 2000, [online], [Retrieved Apr. 19, 2024]. Retrieved from Internet <URL:https://ieeexplore.ieee.org/document/850426> (183pgs).

*Primary Examiner* — Joseph R Maniwang
(74) *Attorney, Agent, or Firm* — BAUGH LAW LLC

(57) ABSTRACT

Embodiments of multi-host link aggregation are described for active-active cluster implementations. In one or more embodiments, a multi-host LAG bond in the cluster is created with a bond MAC address designated for the bond. Afterwards, a virtual IP address may be created for all hosts within the multi-host LAG bond. Compared with existing active-active cluster implementation, the presented multi-host link aggregation embodiments do not require extra entities, e.g., load balancer or DNS, which could be a failure point or performance bottleneck, thus makes the active-active cluster implementations more efficient and robust. With the Multi-Host LACP bond and virtual IP on all hosts, the cluster may have increased bandwidth to the cluster service and utilize computing capacity in a network switch for improved workload distribution.

20 Claims, 16 Drawing Sheets

600

Upon creation of the multi-host LACP bond, coordinating, by the cluster management network, all hosts in the multi-host LACP bond to create a service IP for all hosts in the multi-host LACP bond — 605

When a neighbor host sends an ARP query for the service IP, one host among the hosts in the multi-host LACP replies with the bonding MAC address — 610

```
┌─────────────────────────────────────────────────────────────┐
│ Sending, from a client, an ARP request to query a MAC       │ ─ 1205
│ address of a virtual IP for a Multi-host LACP bond          │
└─────────────────────────────────────────────────────────────┘
                              │
                              ▼
┌─────────────────────────────────────────────────────────────┐
│ Upon a switch coupled to the client receiving the ARP       │
│ request and forwarding the ARP request to all ports and     │ ─ 1210
│ port channels belong to the network, choosing, by a port    │
│ channel aggregator within the switch, a link among multiple │
│ links within the Multi-host LACP bond                       │
└─────────────────────────────────────────────────────────────┘
                              │
                              ▼
┌─────────────────────────────────────────────────────────────┐
│ Receiving, at a host connected to the chosen link, the ARP  │ ─ 1215
│ request                                                     │
└─────────────────────────────────────────────────────────────┘
                              │
                              ▼
┌─────────────────────────────────────────────────────────────┐
│ Updating, at the host, an entry (e.g., IP1:MAC1) to a host  │
│ ARP cache, and synchronizing, by all multi-host LAG agents  │ ─ 1220
│ under the Multi-host LACP bond, host ARP caches for         │
│ corresponding hosts respectively                            │
└─────────────────────────────────────────────────────────────┘
                              │
                              ▼
┌─────────────────────────────────────────────────────────────┐
│ Sending, from the host to the client via the chosen link,   │
│ an ARP reply indicating that the bond MAC address of the    │ ─ 1225
│ Multi-host LACP bond is the MAC address for the virtual IP  │
└─────────────────────────────────────────────────────────────┘
                              │
                              ▼
┌─────────────────────────────────────────────────────────────┐
│ Updating, at the client, a client ARP cache based on the    │ ─ 1230
│ ARP reply                                                   │
└─────────────────────────────────────────────────────────────┘
```

FIG. 12

MULTI-HOST LINK AGGREGATION FOR ACTIVE-ACTIVE CLUSTER

A. Technical Field

The present disclosure relates generally to information handling systems. More particularly, the present disclosure relates to load balancing in an active-active cluster.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer cluster is a set of computers that work together such that they can be viewed as a single system. The two most commonly used high availability (HA) clustering configurations are active-active and active-passive. Existing approaches to implement active-active cluster include introducing load balancer to distribute workload to cluster nodes or Domain Name System (DNS)-based load balancing. However, load balancer itself could be a performance bottleneck, forwarding requests to proper nodes have cost. DNS-based load balancing is a specific type of load balancing that uses the DNS to distribute traffic across several servers. The DNS provides different IP addresses in response to DNS queries. Typically, the requests are distributed across a group of servers sequentially by round-robin. If a service at one of the addresses in the list fails, the DNS will continue to hand out that address and clients may still attempt to reach the inoperable service.

Accordingly, it is highly desirable to find new, more efficient ways to implement load balancing in an active-active cluster.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 6 depicts a process of service IP creation for a multi-host LACP bond, according to embodiments of the present disclosure.

FIG. 12 depicts a process for the interaction between clients and hosts under a Multi-host LACP bond for ARP cache updating, according to embodiments of the present disclosure.

DETAILED DESCRIPTION OF EMBODIMENTS

Figure 1:
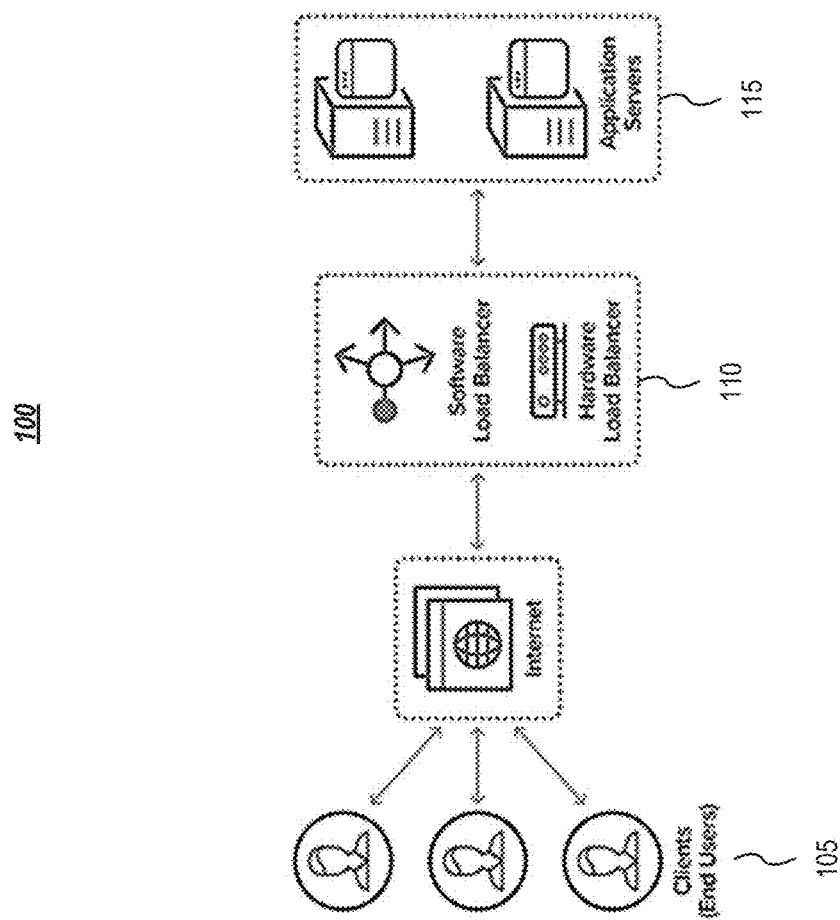
FIG. 1 ("FIG. 1") depicts using a load balancer for workload distribution among cluster nodes.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of active-active clustering, aspects of the present disclosure are not so limited. Accordingly, the aspects of the present disclosure may be applied or adapted for use in other contexts.

A. Existing Approaches to Implement Active-Active Cluster

Active-Active and Active-Passive are the two most commonly used high-availability clustering configurations. An active-active cluster is typically made up of at least two nodes, both actively running the same type of service simultaneously. An active-passive cluster also comprises at least two nodes. However, not all nodes in the active-passive cluster are active. In the case of two nodes, for example, if the first node is active, the second node shall be passive or on standby.

Introducing a load balancer to distribute workload to cluster nodes is an approach for Active-Active cluster implementation. FIG. 1 depicts using a load balancer for workload distribution among cluster nodes. A load balancer 110, which may be a software load balancer or a hardware load balancer, couples between a plurality of end users 105 and multiple cluster nodes (application servers) 115 to distribute workload among the multiple cluster nodes. In certain circumstances, the load balancer itself may be a performance bottleneck, which may bring excessive cost in forwarding requests to proper nodes.

DNS-based load balancing is another existing approach for Active-Active cluster implementation. This approach uses the DNS to distribute traffic across several servers. The DNS provides different IP addresses in response to DNS queries. Typically, the requests are distributed across a group of servers sequentially by round-robin. If a service at one of the addresses in the list fails, the DNS will continue to hand out that address and clients may still attempt to reach the inoperable service.

B. Embodiments of Multi-Host Link Aggregation

Descried hereinafter are embodiments of multi-host link aggregation for active-active cluster implementation. Compared with existing active-active cluster implementation, multi-host link aggregation approach does not require extra entities, e.g., load balancer or DNS, which could be a failure point or performance bottleneck, thus makes the active-active cluster implementation more efficient and robust.

Link aggregation (LAG) is a method of combining or aggregating multiple network connections in parallel. The implementation may follow vendor-independent standards, such as Link Aggregation Control Protocol (LACP) for Ethernet defined in IEEE standards, or proprietary protocols. Link Aggregation was originally published as IEEE standard 802.3ad-2000. The standard specified the aggregation of full-duplex point-to-point links using IEEE Standard 802.3 media of the same Speed. IEEE Standard 802.1AX-2014 extended Link Aggregation in three areas:

1) Aggregation of point-to-point links of any speed using any physical media or logical connection capable of supporting the internal Sublayer Service specified in IEEE Standard 802.1AC;
2) It specified Conversation-Sensitive Collection and Distribution (CSCD) that provides a mechanism to identify the distribution algorithm in use to map data frames to individual links in the LAG and convey that information to the Link Aggregation Partner via LACPDUs; and
3) It specified Distributed Resilient Network Interconnect (DRNI) that allows a LAG to terminate at two or three cooperating Systems (Otherwise, system-level redundancy can be supported by property technics such as MLAG or Multi-Chassis LACP).

Link selection for outgoing traffic may be done according to a transmit hash policy, which may be changed from the default simple XOR policy via the xmit_hash_policy. IEEE standard 802.3ad for link aggregation (LAG) recites in Section 43.2.4 Frame Distributor that:

The standard does not mandate any particular distribution methods; however, any distribution method shall ensure that, when frames are received by a Frame Collector, the method should not cause:

a) Mis-ordering of frames that are part of any given conversation, or
b) Duplication of frames.

The above requirement of maintaining frame ordering may be met by ensuring that all frames that compose a given conversation are transmitted on a single link in the order that they are generated by the MAC Client. In one or more embodiments of the present disclosure, the conversion is referred to as a set of frames transmitted from one end station to another, with the assumption that the communicating end stations require intermediate systems to maintain the ordering of those frames, as defined in IEEE standard 802.1AX Section 3. Conversations can be moved among Aggregation Ports within an aggregation, both for load balancing and to maintain availability in the event of link failures. Frame ordering can be maintained when conversations are moved. A conversation may be numbered using a conversation ID, which is an integer in the range of 0 through 4095, where each value identifies one or more conversations. A Frame Distributor is responsible for taking outgoing frames from the Aggregator Client and transmitting them through the set of links that form the LAG. The Frame Distributor implements a distribution function (algorithm/method/methodology) responsible for choosing the link to be used for the transmission of any given frame or set of frames. IEEE standard allows a wide variety of distribution algorithms. However, practical frame distribution algorithms do not mis-order frames that are part of any given conversation, nor do they duplicate frames.

In one or more embodiments of the present disclosure, LACP is taken as the protocol for multi-host link aggregation. Considering that LACP is an L1/L2 protocol, it is assumed that all clients and cluster hosts are located in the same network in one or more embodiments.

Figure 2:
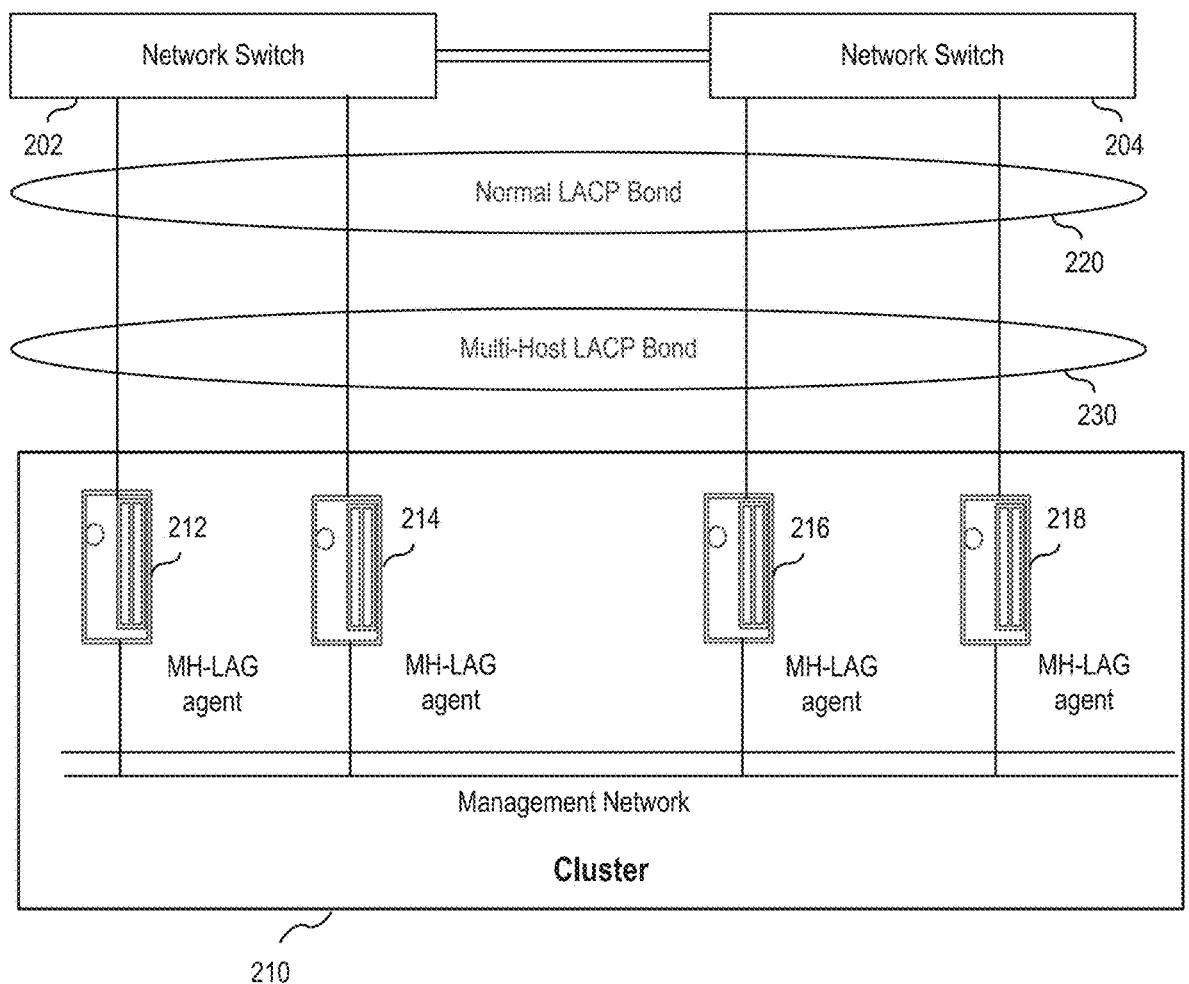
FIG. 2 depicts a multi-host Link Aggregation Control Protocol (LACP) bond regarded as a normal LACP bond, according to embodiments of the present disclosure.

FIG. 2 depicts a multi-host LACP bond that may be regarded as a normal LACP bond, according to embodiments of the present disclosure. On a network side, multiple ports from one or multiple network switches, e.g., switches 202 and 204, may be chosen to build an LACP or multi-chassis LACP bond 220. On a host side, a cross-host bond or multi-host LACP bond 230, which may also be referred to as a multi-host LAG bond in one or more embodiments, may be built by choosing ports across multiple hosts, e.g., hosts 212, 214, 216, and 218, in a cluster 210. The multi-host LACP bond 230 may be regarded as a normal LACP bond 220 by its peer ports on the switch side. As shown in the exemplary embodiment in FIG. 2, the cluster 220 comprises hosts 212, 214, 216, and 218. The hosts may be interconnected by a management network. Each host has one service Ethernet port connected to a member of the LACP bond on the switch side. Each host in the cluster provides the same service, e.g., web services.

In one or embodiments, a multi-host LAG (also referred to as MH-LAG) agent, which may be a software agent, is installed on all hosts involved in the multi-host LACP bond. The multi-host LAG agent is responsible for host management and communication, and simulation of a multi-host bond as a normal LACP bond. A multi-host LAG agent may act as a primary agent or a normal agent. In a cluster, there is one and only one primary agent, which may be assigned when a multi-host LACP bond is created or be elected if a current primary agent is down. Except for primary agent, all other agents in the cluster are normal agents.

In one or embodiments, all multi-host LAG agents are configured to maintain one or more variables and/or data structures, e.g., a bond MAC address, in a local bond member table and/or a remote bond member table in local. In other words, each multi-host LAG agent, primary or normal, maintains at a local host where each multi-host LAG agent resides, a local bond member table, and a remote bond member table. An exemplary local bond member table and an exemplary remote bond member table are shown in Table 1 and Table 2, respectively.

TABLE 1

Local Bond Member Table

| Port name | Speed | Maximum Transmission Unit (MTU) | Duplex Mode | State | Last sync |
|---|---|---|---|---|---|
| Eth2 | 10G | 1500 | Duplex | UP | 1515 |

TABLE 2

Remote Bond Member Table

| Port name | Speed | MTU | Duplex Mode | State | Last sync |
|---|---|---|---|---|---|
| Host1.eth3 | 10G | 1500 | Duplex | UP | 1515 |
| Host2.eth2 | 10G | 1500 | Duplex | UP | 1515 |
| Host3.eth2 | 10G | 1500 | Duplex | Up | 1515 |
| Host4.eth2 | 10G | 1500 | Duplex | Up | 1515 |

1. Initialization of Primary and Normal Multi-Host LAG Agents

Figure 3:
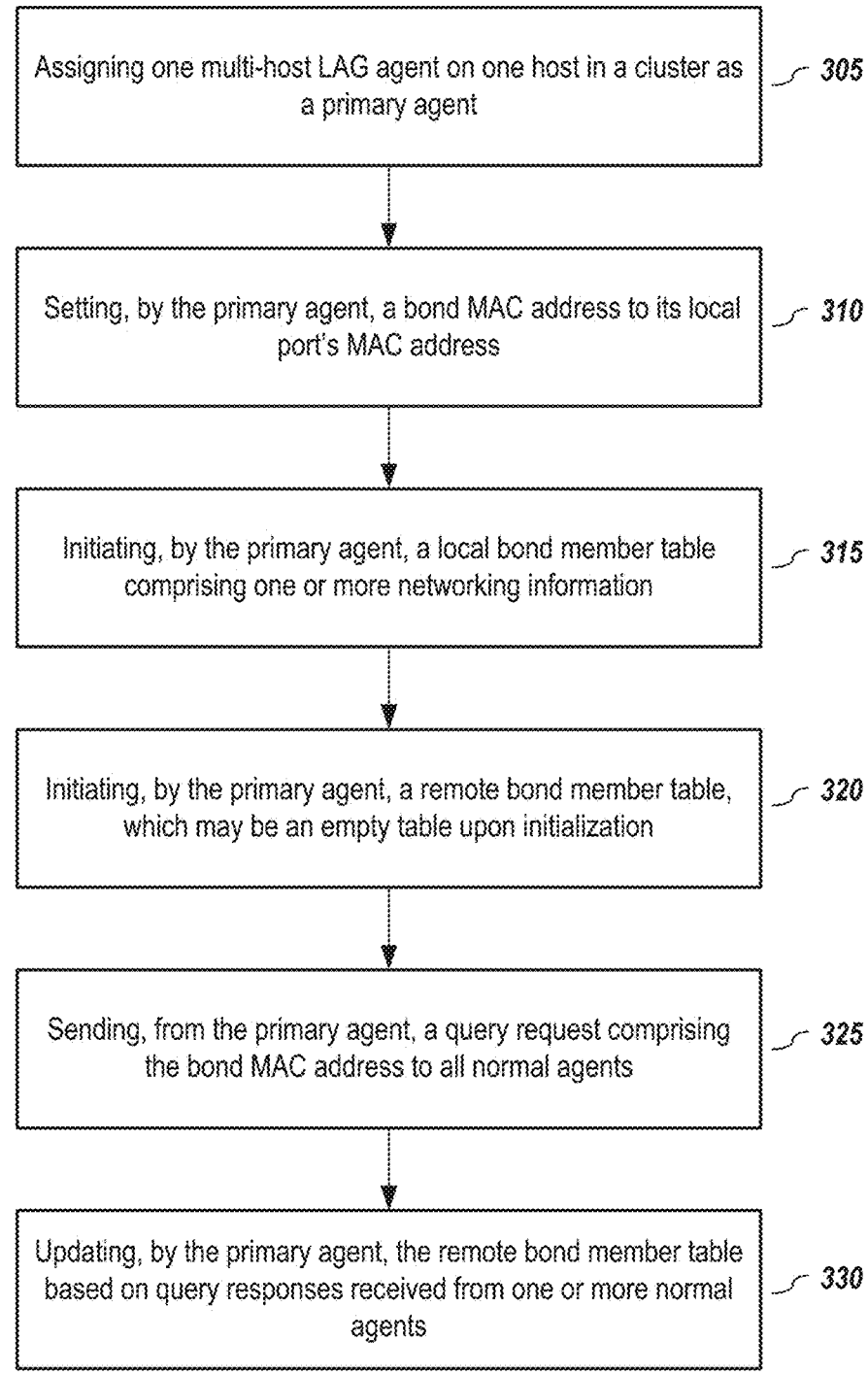
FIG. 3 depicts a process of initializing a primary multi-host LAG agent, according to embodiments of the present disclosure.

In one or more embodiments, all multi-host LAG agents are up and running on hosts in an idle state. The multi-host LAG agents are listening on corresponding TCP/UDP ports on management Ethernet port. FIG. 3 depicts a process of initializing a primary multi-host LAG agent, according to embodiments of the present disclosure. In step 305, when a Command Line Interface (CLI) is called to create a multi-host LAG bond in the cluster with one port from each host, one multi-host LAG agent on one host is assigned as the primary agent in the CLI. All other agents in the cluster under the multi-host LAG bond are normal agents. Once the CLI is called or issued, all the multi-host LAG agents are transitioned from an idle state to an initialization state. The primary agent and normal agents exchange information using one or more of the following steps to implement the multi-host LAG initialization.

In step 310, the primary agent sets a bond MAC address to its local port's MAC address. In step 315, the primary agent initiates a local bond member table comprising networking information, which may be queried using a command-line tool, such as ethtool, for network interface management and information querying.

In step 320, the primary agent initiates, in a local host where the primary agent resides, a remote bond member table, which may be an empty table upon initialization. In step 325, the primary agent sends a query request comprising the bond MAC address to all normal agents periodically. In step 330, the primary agent updates the remote bond member table based on query responses received from one or more normal agents. The primary agent may set a timer, which may be configurable, for all normal agents to report their status. If a normal agent does not reply to the query request within a specific period according to the timer, the primary agent may mark a state of the normal agent in the remote bond member table as down. Once responses from all normal agents are received, the remote bond member table is done for updating, and the primary multi-host LAG agent is now in a bonding state.

Figure 4:
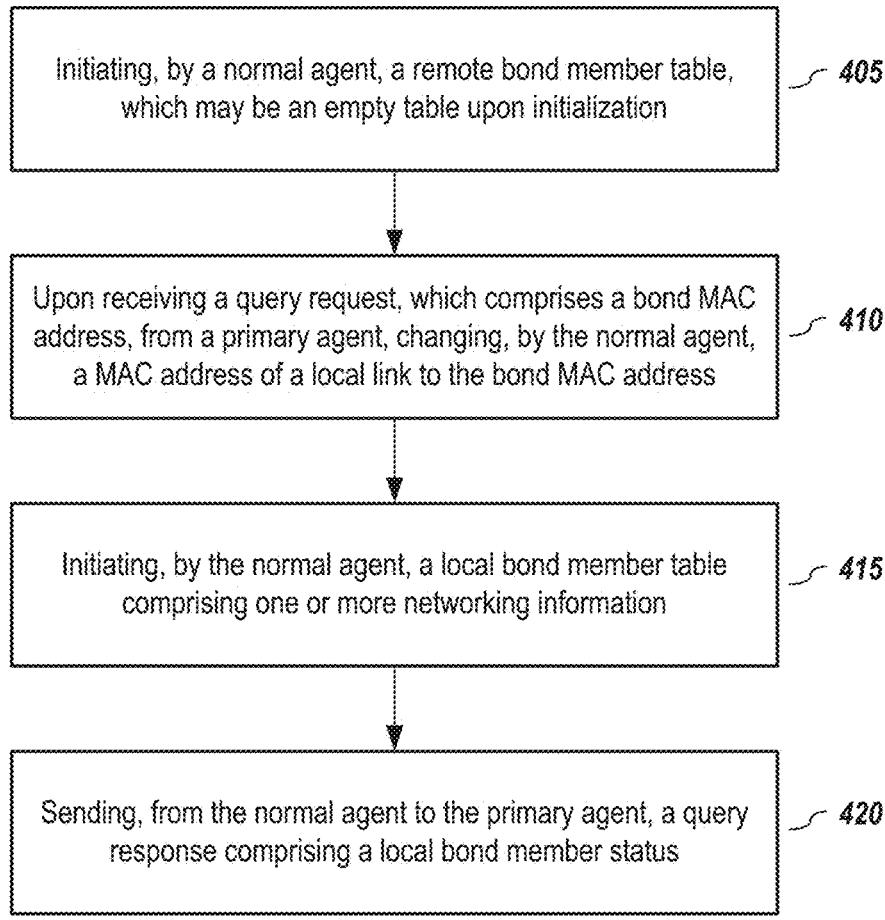
FIG. 4 depicts a process of initializing a normal multi-host LAG agent, according to embodiments of the present disclosure.

FIG. 4 depicts a process of initializing a normal multi-host LAG agent, according to embodiments of the present disclosure. In step 405, a normal multi-host LAG agent initiates a remote bond member table, which may be an empty table upon initialization. In step 410, upon receiving a query request, which comprises a bond MAC address, from a primary agent, the normal multi-host LAG agent changes a MAC address of a local link to the bond MAC address. In step 415, the normal agent initializes a local bond member table comprising one or more networking information, which may be queried using a command-line tool, such as ethtool, for network interface management and information querying. In step 420, the normal agent sends the primary agent a query response comprising a local bond member status. Once the query response is sent, the normal multi-host LAG agent is now in a bonding state.

In a bonding state, the primary agent may periodically advertise all bond member statuses to normal agents and may also periodically update its local bond member table using a querying tool, e.g., ethtool. Similarly, a normal agent may periodically update its local bond member table and report its local bond member status to the primary agent. The normal agent may also periodically update its remote bond member table based on advertisement messages sent from the primary agent.

In one or more embodiments, in a bonding state, all multi-host LAG agents periodically send an LACP Protocol Data Unit (PDU) to peer ports according to LACP Protocol. The LACP PDU is constructed based on the information in the local bond member table and the remote bond member table.

In one or more embodiments, instead of implementing a real LACP bond across multiple hosts, the Multi-Host LAG bond is to make the network switch or switches believe the bond on peer side is a valid LACP bond. For outbound packets that are not within the boundary of the Multi-Host LAG bond, each host may still use its local link, which is not included in the Multi-Host LAG bond, for packets receiving or transmitting.

2. Embodiments of Multi-Host LACP-Based Active-Active Cluster

Figure 5:
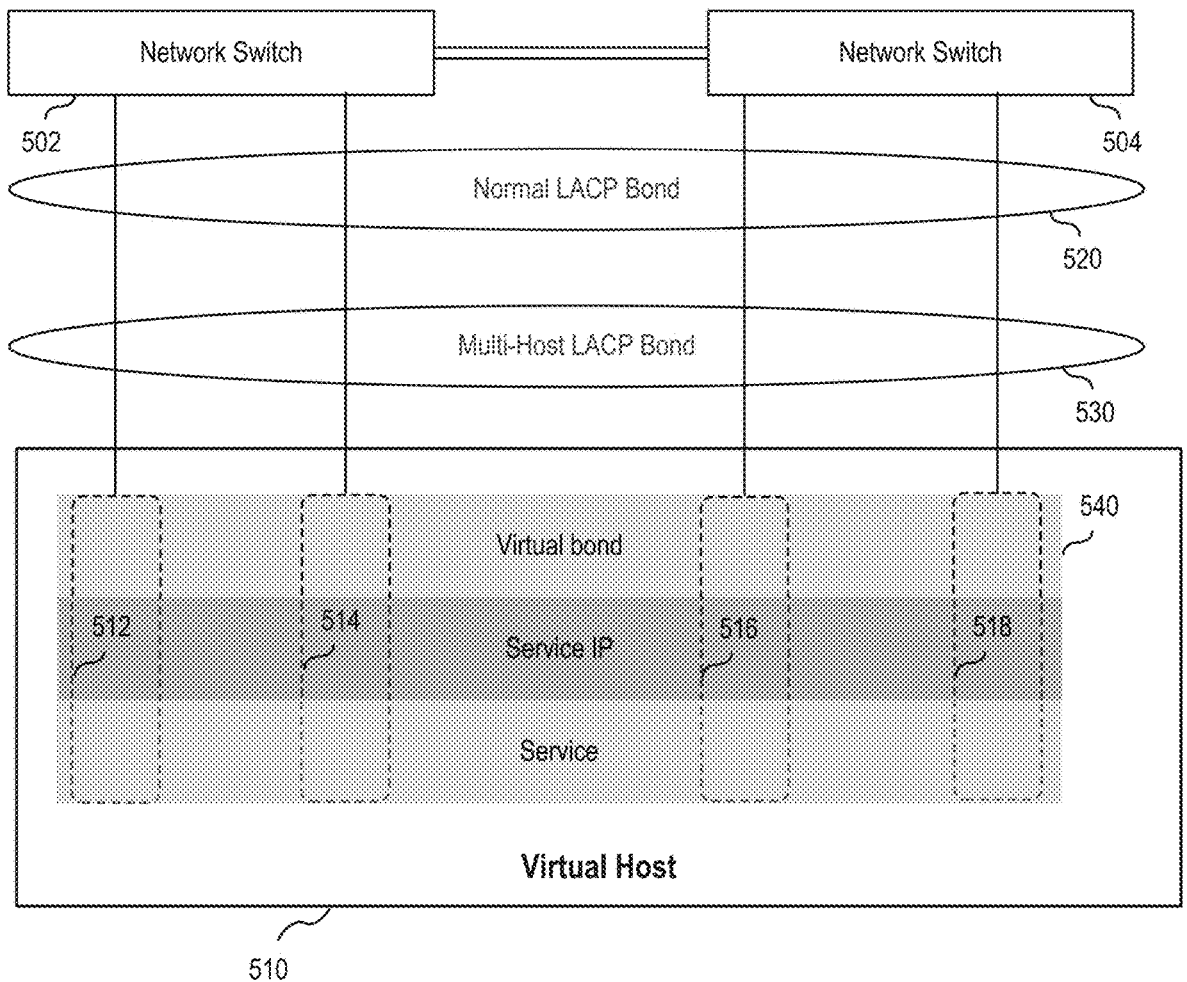
FIG. 5 depicts hosts regarded as a virtual host from an LACP bond point of view, according to embodiments of the present disclosure.

FIG. 5 depicts hosts regarded as a virtual host, according to embodiments of the present disclosure. A multi-host LACP bond 530 is created for hosts 512, 514, 516, and 518. The multi-host LACP bond 530 may be viewed by switches 502 and 504 as a normal LACP bond 520. From LACP bond point of view, hosts 512, 514, 516, and 518 in a cluster 510 may be regarded as a virtual host 540.

Figure 7:
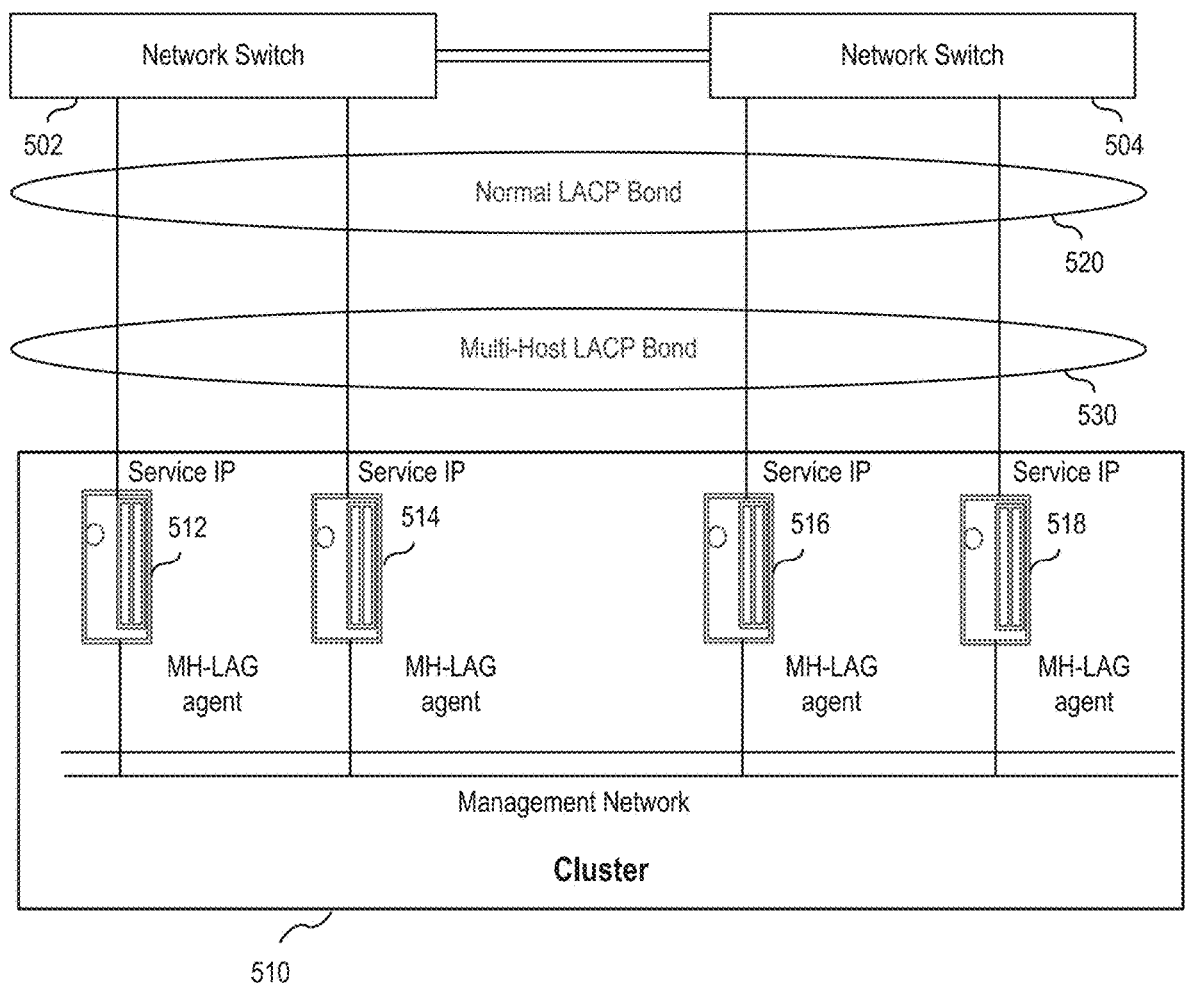
FIG. 7 depicts a virtual service IP created and used by all hosts in a multi-host LACP bond, according to embodiments of the present disclosure.

FIG. 6 depicts a process of service IP creation for a multi-host LACP bond, according to embodiments of the present disclosure. To implement the service IP creation, a cluster management network may need to first create a multi-host LACP bond in the cluster, as described in the above section. In step 605, upon creation of the multi-host LACP bond, the cluster management network coordinates all hosts in the multi-host LACP bond to create a service IP, which may be a virtual IP, to all hosts in the multi-host LACP bond for service(s) provided by the cluster. The virtual service IP may be created on all hosts' local links and be used by all hosts in the multi-host LACP bond, as indicated in FIG. 7.

In step 610, when a neighbor host, e.g., a host in the same subnet of the hosts in the multi-host LACP, sends an address resolution protocol (ARP) query for the service IP, only one host among the hosts in the multi-host LACP replies with the bond MAC address such that the neighbor host knows the MAC address for the service IP. The host receiving the ARP query may or may not the host where the primary agent resides, depending on a distribution algorithm on network switch. Theoretically, any host involved in the multi-host LACP bond may receive the request. For each ARP request (might from different neighbors), only one host involved in multi-host LACP bond might receive the request. In one or more embodiments, the ARP query sent by a neighbor (e.g., a gateway) may be an ARP broadcast query. A network switch may distribute the ARP broadcast query to only one aggregation port, and therefore, only one host in the multi-host LACP bond may receive the ARP request, even if the ARP request is broadcast.

Under the Internet Protocol version 6 (IPv6) protocol, if Duplicate Address Detection (DAD) verifies that a unicast IPv6 address is a duplicate, the address may not be used. If the link-local address of the VLAN interface is found to be a duplicate of an address for another device on the interface, the interface stops processing IPv6 traffic. In one or more embodiments of the present disclosure, the DAD may be skipped for IPV6 during the service IP and link-local IP creation such that the service IP address may be used by all hosts for the multi-host LACP bond.

Since the LACP bond is configured on a network switch side, it is guaranteed by the network switch that in-bound frames that compose a given conversation are transmitted on a single link in order of frames. For example, assuming layer 2/3 or layer 3/4 is configured as a distribution algorithm on a network switch, the frames from client 1 always go through one specific link, while traffic from client 2 goes through another link. Workloads from different clients are balanced on different hosts in the cluster.

3. Embodiments of LACP Bond Frame Distribution

Embodiments of Multi-host LACP-based active-active cluster may be implemented to utilize Link Aggregation (LAG) technology for active-active, load balancing, and fault-tolerant cluster. The Multi-host LACP virtually bonds physical links terminated on different physical hosts in one cluster and makes the multi-host bond appear as a normal LACP bond by LACP Actor on a network switch side. With the approach of Multi-Host LACP and virtual IP on all hosts in the multi-host bond, the cluster may have one or more of the following benefits:

Increased bandwidth to the cluster service;
Utilizing computing capacity in a network switch for workload distribution;
Utilizing capability of network switch for workload balance;
Utilizing Multi-chassis Link Aggregation Group (MLAG) or Distributed Resilient Network Interconnect (DRNI) for network switch level redundancy;
Port-level redundancy; and
Host-level redundancy.

It shall be noted that the Multi-Host LACP is not an implementation of IEEE standard 802.3ad or 802.1AX. Rather, it makes a network switch viewing a multi-host bond as a normal LACP bond by emulating an LACP actor to respond to incoming Link Aggregation Control Protocol Data Unit (LACPDU). There is no similar implementation like DRNI or MLAG in Multi-Host LACP, because there is no need to relay RX or TX frames from or to other host(s) in the cluster. Therefore, any host in the Multi-Host LACP bond of the cluster may be an endpoint.

Figure 8:
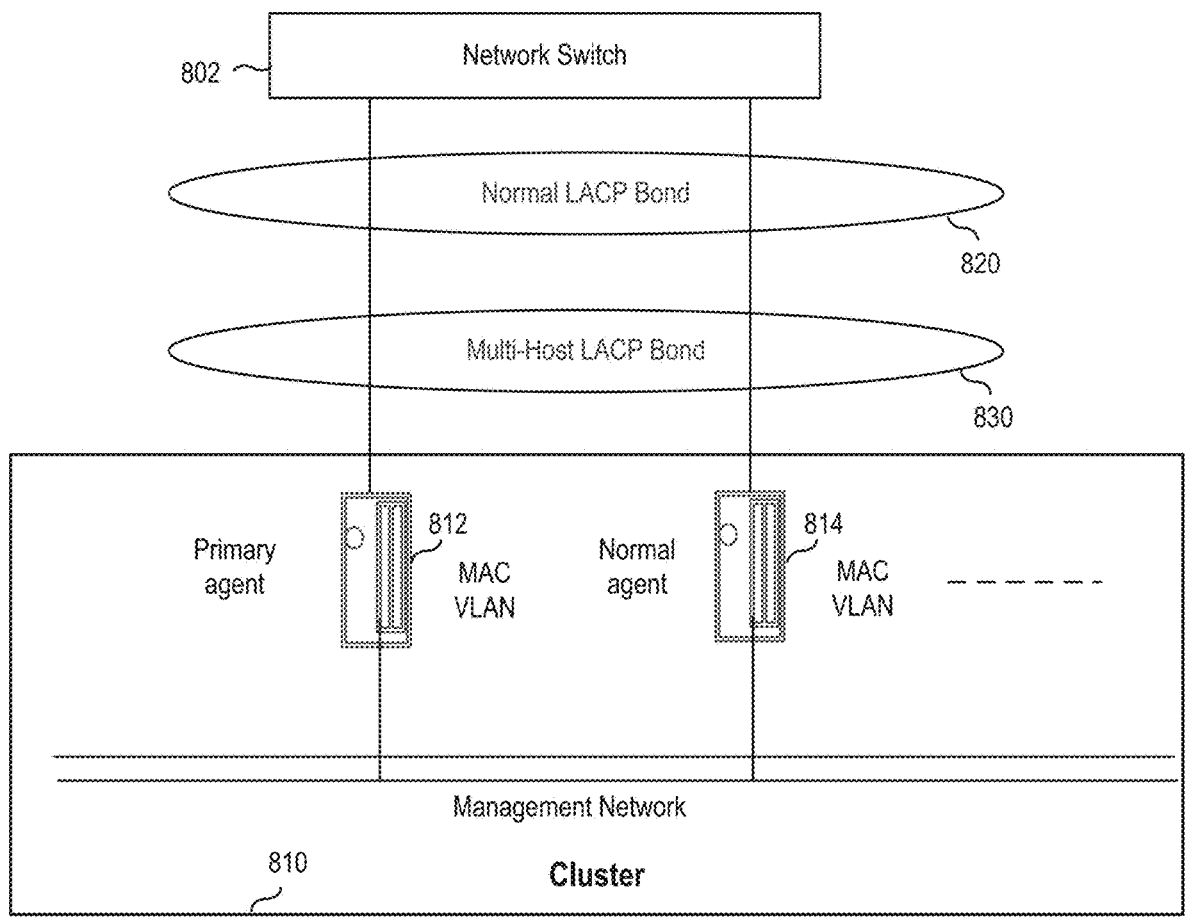
FIG. 8 depicts a first Multi-host LACP configuration with single link per host, according to embodiments of the present disclosure.

FIG. 8 depicts a first Multi-host LACP configuration with single link per host, according to embodiments of the present disclosure. On a network side, multiple ports of one or more network switches, e.g., a network switch 802, are chosen to build an LACP or multi-chassis LACP bond 820. On a host side, a cross-host bond or multi-host LACP bond 830 may be built by choosing ports from multiple hosts, e.g., hosts 812 and 814, in a cluster 810. The multi-host LACP bond 830 may be regarded as a normal LACP bond 820 by its peer ports on the switch side. Each host within the multi-host LACP bond 830 has only one link to the network switch 802. The hosts are interconnected by a management network. Host 812 has a multi-host LAG agent installed and designated as a primary agent for the multi-host LACP bond 830. Host 814 has a multi-host LAG agent installed and designated as a normal agent for the multi-host LACP bond 830. As shown in FIG. 8, such a Multi-host LACP configuration with a single link per host is simple, but it has no redundancy on an Ethernet port and network switch level for a host.

Figure 9:
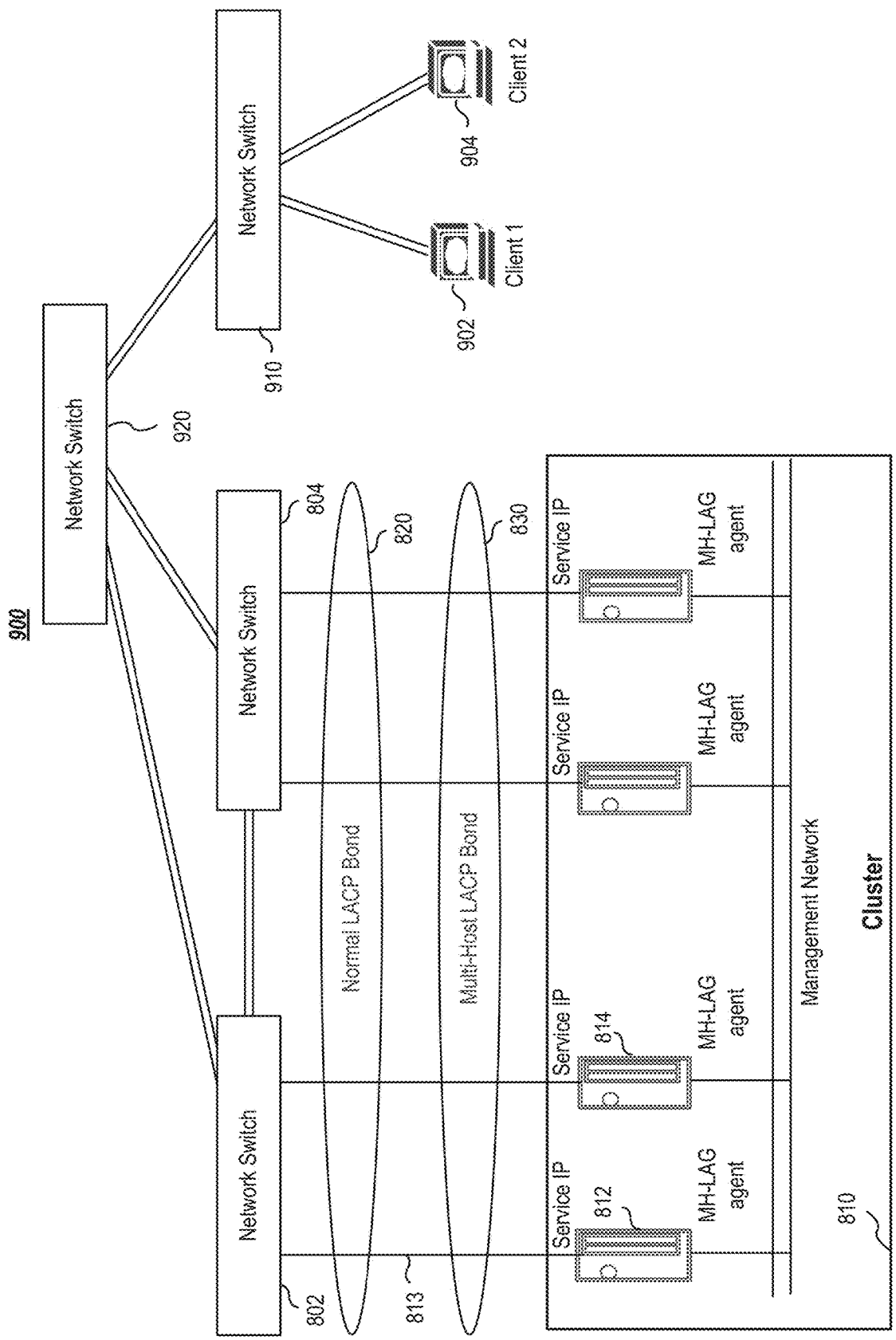
FIG. 9 depicts a load distribution of the first Multi-host LACP configuration, according to embodiments of the present disclosure.

FIG. 9 depicts a load distribution of the first Multi-host LACP configuration, according to embodiments of the present disclosure. Hosts bound in the multi-host LACP bond 830 provide service to multiple clients, e.g., a first client 902 and a second client 904 via network switches, which may include not only the network switches 802/804 connected to the multi-host LACP bond 830 but also additional switches, e.g., switch 910/920.

In a normal situation, RX workload to the hosts may be distributed by an LACP frame distributor on a network side. For example, RX workload may be distributed, by an LACP frame distributor within the network switch 802, among hosts 812/814 such that RX workload from the first client 902 is distributed via a link 813 to the host 812, while RX workload from the second client 904 is distributed to the host 814. Regarding TX traffic, since there is only one link per host, RX and TX may always use the same link in the multi-host LACP bond 830. For example, the link 813 may be used for both RX and TX workloads for the first client 902.

In one or more embodiments, when a link, e.g., the link 813, is failed or overloaded, the LACP distributor on the network side, e.g., in the network switch 802, moves a conversation served by the link to another port in LAG. Since there is only one link per host, the previously established conversion via the link fails, the client needs to retry and re-establish a conversion via a different link to another host.

Figure 10:
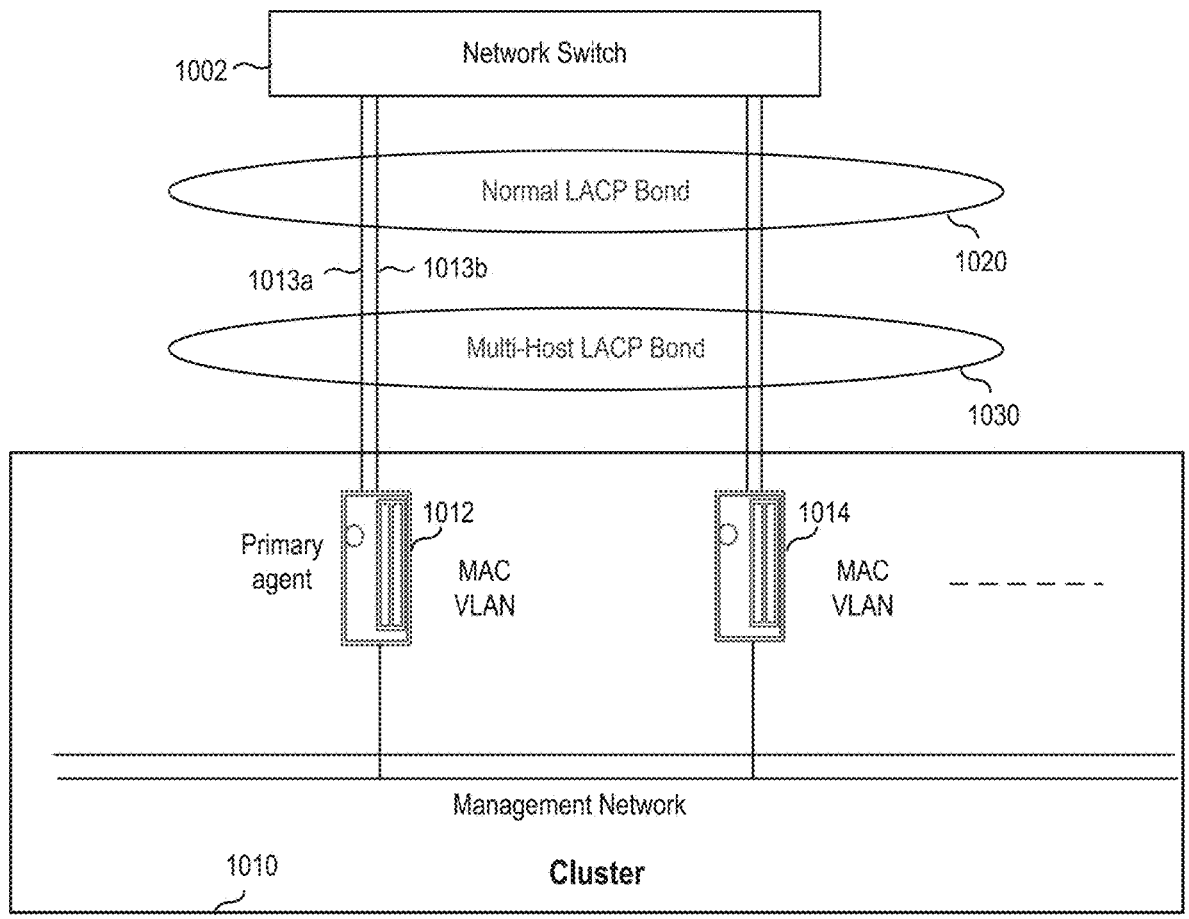
FIG. 10 depicts a second Multi-host LACP configuration with multi-link per host, according to embodiments of the present disclosure.

FIG. 10 depicts a second Multi-host LACP configuration with multi-link per host, according to embodiments of the present disclosure. On the network side, multiple ports of one or more network switches, e.g., a network switch 1002, are chosen to build an LACP or multi-chassis LACP bond 1020. On the host side, a cross-host bond or multi-host LACP bond 1030 may be built by choosing ports from multiple hosts, e.g., hosts 1012 and 1014, in a cluster 1010. The multi-host LACP bond 1030 may be regarded as a normal LACP bond 1020 by its peer ports on the switch side. Each host within the multi-host LACP bond 1030 has multiple links to the network switch 1002. The hosts are interconnected by a management network. Host 1012 has a multi-host LAG agent installed and designated as a primary agent for the multi-host LACP bond 1030. Host 1014 has a multi-host LAG agent installed and designated as a normal agent for the multi-host LACP bond 1030.

As shown in FIG. 10, the Multi-host LACP configuration with multi-link per host introduces port level redundancy, and may utilize switch level redundancy if MLAG or DRNI is supported at the switch side. In one or more embodiments, when conversation-sensitive collection and distribution (CSCD) is configured properly on the network side, a frame distributor on a network switch may prioritize ports on the same host with a priority level higher than other ports. If one link on a host, e.g., link 1013a for host 1012, is failed or overloaded, a frame distributor on the network switch 1002 prioritizes link(s), e.g., link 1013b, on the same host over other links. Therefore, when moving a conversation from one link (e.g., link 1013a) to another link (e.g., link 1013b) for the same host, frame mis-ordering/re-transmit may be avoided, and the previously established would not fail.

For a Multi-host LACP configuration with multi-link per host, it may not be mandatory to make the TX and RX traffic of the same conversation to the same link, although such an arrangement of the same link for TX and RX traffic may facilitate load balancing, detailed traffic management, bandwidth control, and implementation of monitoring and policing functions on a LAG. To achieve the arrangement, a Multi-host LACP bond may need to be CSCD-aware such that the frame/port mapping information on a network side may be conveyed to a host side by LACPDU.

In one or more embodiment, instead of implementing CSCD-awareness in a Multi-host LACP bond, a cache mechanism may be implemented on a host side to achieve one link for TX and RX traffic. A cache on a host side may be configured to record a mapping of conversation IDs (calculated based on the incoming frame) and link_IDs. TX traffic may be designated to a desired link with a link_ID retrieved from the cache based on a conversation_ID calculated from TX frame(s). The cache mechanism is also applicable if an LACP bond on the network side conforms to IEEE standard 802.3ad only. Since a conversation is always initiated from a client, such a cache mechanism is doable for the server/host, which may find a desired link_ID in cache for TX frames.

Embodiments of Multi-host LACP based active-active cluster utilize LACP bond frame distribution mechanisms or algorithm(s) to perform load balancing for the active-active cluster. Although IEEE 802.3ad standard does not mandate any particular distribution algorithm(s), the standard-compliant distribution algorithm (esp. the packet mis-ordering requirements) may be used in a multi-host LACP based active-active cluster because the standard-compliant distribution algorithm ensures that all frames of a given conversation are transmitted on a single link in order. Currently, LACP bonding distribution algorithm is widely implemented in layer 2, layers 2 and 3, and/or layers 3 and 4.

Compared with existing Active-Active cluster implementation, embodiments of multi-host LACP-based active-active cluster implementation remove extra entities like load balancer or DNS, which could be a failure point or performance bottleneck. Once a multi-host LACP Bond is created and a Virtual Service IP is configured for the bond, the multi-host LACP based active-active cluster implementation needs few or no changes on cluster data path.

C. Embodiments for Client/Host Interaction Under Multi-Host LAG

Figure 11:
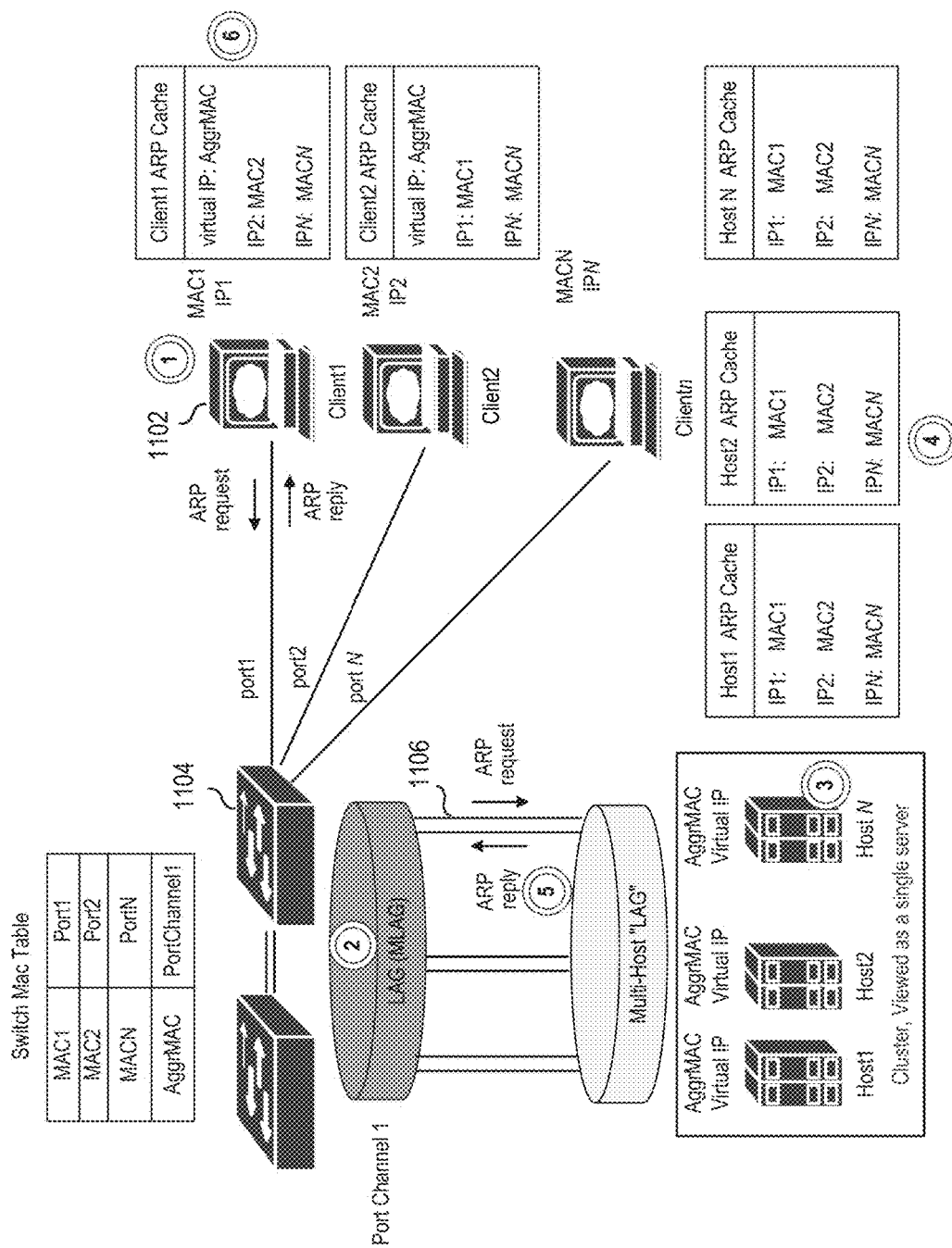
FIG. 11 graphically depicts interaction between clients and hosts under a Multi-host LACP bond for Address Resolution Protocol (ARP) cache updating, according to embodiments of the present disclosure.

Considering that an LACP is a protocol for layers 1 and 2, it may be assumed that clients and a cluster of hosts are located in the same network. FIG. 11 and FIG. 12 respectively depict a block diagram and a process for interaction between clients and hosts under a Multi-host LACP bond for Address Resolution Protocol (ARP) cache updating, according to embodiments of the present disclosure. For ARP cache update, a host, such as a Linux host, may add an entry to its ARP cache if a received packet is a reply to itself or if the received packet is a request for its host address.

In step 1205 (also graphically depicted as ① in FIG. 11), when a client in a network (e.g., the client 1102) needs to know a MAC address for the virtual IP for a Multi-host LACP bond, the client sends out an ARP request, which is a broadcast request, to query the MAC address of virtual IP.

In step 1210 (also graphically depicted as ② in FIG. 11), upon a switch coupled to the client (e.g., the switch 1104) receiving the ARP request and forwarding the ARP request to all ports and port channels belong to the network (since the ARP request is a broadcast request), a port channel aggregator within the switch chooses a link (e.g., the link 1106), among multiple links within the Multi-host LACP bond, based on a distribution algorithm. In one or more embodiments of the present disclosure, a port channel may also be referred to as a link aggregation group.

In step 1215 (also graphically depicted as ③ in FIG. 11), a host (e.g., the host N) connected to the chosen link receives the ARP request. In step 1220 (also graphically depicted as ④ in FIG. 11), the host updates an entry (IP1: MAC1) to its host ARP cache and all multi-host LAG agents under the Multi-host LACP bond monitor and synchronize host ARP caches for corresponding hosts respectively.

In step 1225 (also graphically depicted as ⑤ in FIG. 11), the host sends an ARP reply, via the chosen link, to the client indicating that the bond MAC address, also referred to as an aggregated MAC address, of the Multi-host LACP bond is the MAC address for the virtual IP. In step 1230 (also graphically depicted as ⑥ in FIG. 11), the client receives the ARP reply and updates its client ARP cache based on the ARP reply. The client ARP cache on a host stores IP addresses and MAC address of neighbor hosts. It shall be noted that switch MAC tables(s) on the network switch side may also be updated accordingly.

Figure 13:
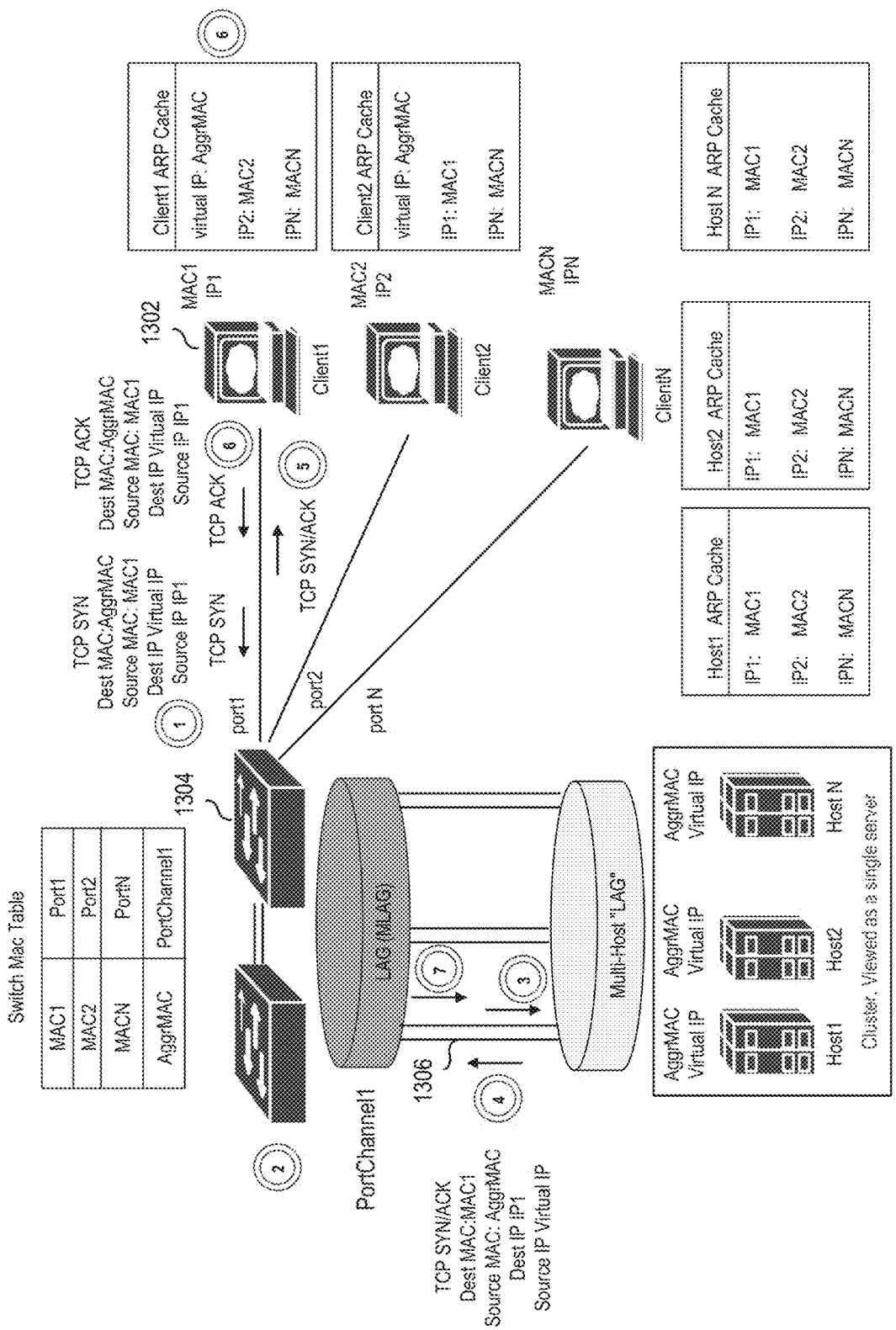
FIG. 13 graphically depicts a Transmission Control Protocol (TCP) session initiation between clients and hosts under a Multi-host LACP bond for ARP cache updating, according to embodiments of the present disclosure.
Figure 14:
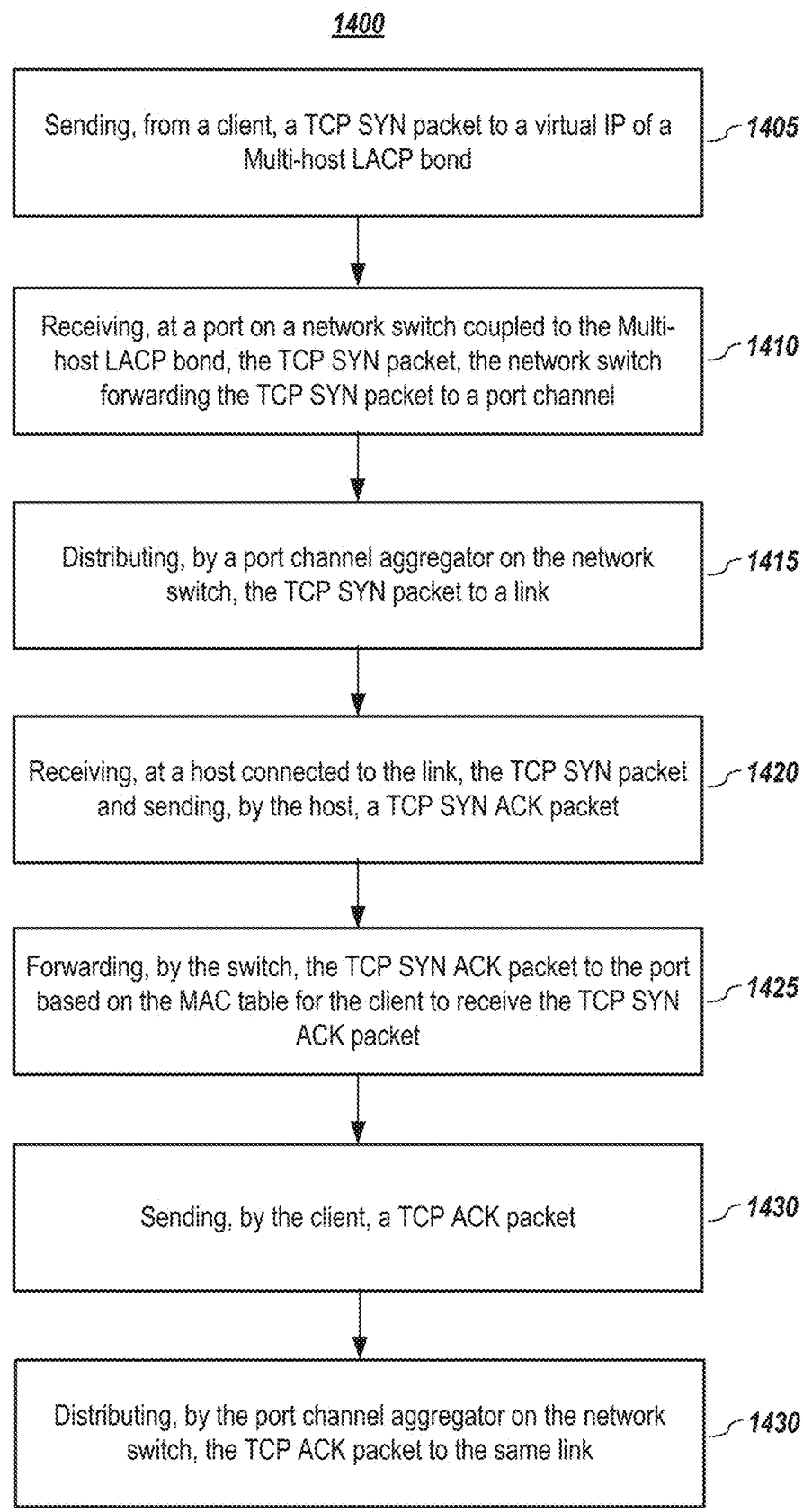
FIG. 14 depicts a process for the TCP session initiation between clients and hosts under a Multi-host LACP bond for ARP cache updating, according to embodiments of the present disclosure.

Once ARP cache update for hosts and clients is complete, a TCP session may be initiated from a client side. FIG. 13 and FIG. 14 respectively depict a block diagram and a process for a TCP session initiation between clients and hosts under a Multi-host LACP bond for ARP cache updating, according to embodiments of the present disclosure.

In step 1405 (also graphically depicted as ① in FIG. 13), when a client in a network (e.g., the client 1302) sends a TCP synchronization (SYN) packet to the virtual IP. The TCP SYN packet comprises a destination MAC address that is the aggregated MAC address, a source MAC address that is the MAC address of the client, a destination IP address that is the virtual IP, and a source IP address that is the IP address of the client.

In step 1410 (also graphically depicted as ② in FIG. 13), a network switch coupled to the Multi-host LACP bond receives the TCP SYN packet at a port (e.g., port 1) and forwards the TCP SYN packet to a port channel, e.g., Port Channel1 shown in FIG. 13, based on a MAC table in the network switch.

In step 1415 (also graphically depicted as ③ in FIG. 13), a port channel aggregator, which may also be referred to as a switch aggregator, on the network switch distributes, based on a distribution algorithm, the TCP SYN packet to a link, e.g., link 1306.

In step 1420 (also graphically depicted as ④ in FIG. 13), a host (e.g., the host 1) connected to the link receives the TCP SYN packet and sends back a TCP SYN acknowledgement (ACK) packet that comprises a destination MAC address that is the MAC address of the client, a source MAC address that is the aggregated MAC address, a destination IP address that is the IP address of the client, and a source IP address that is the virtual IP.

In step 1425 (also graphically depicted as ⑤ in FIG. 13), the switch forwards the TCP SYN ACK packet to the port based on the MAC table for the client to receive the TCP SYN ACK packet.

In step 1430 (also graphically depicted as ⑥ in FIG. 13), the client sends a TCP ACK packet comprising a destination MAC address that is the aggregated MAC address, a source MAC address that is the MAC address of the client, a destination IP address that is the virtual IP, and a source IP address that is the IP address of the client.

In step 1435 (also graphically depicted as ⑥ in FIG. 13), the port channel aggregator on the network switch distributes the TCP ACK packet to the same link (e.g., link 1306) as in step 1415 since the TCP SYN packet and the TCP ACK packet belong to the same conversation and the TCP session is established between the client and the host. Consecutive TCP packets sent by the client within this TCP session should be distributed to the same link to the host by the switch aggregator in the network switch.

The TCP session may be established and maintained unless a link failure happened. If the host has multiple links in LAG for connection to the network switch, and the network switch supports IEEE 802.1AX standard, CSCD may be utilized to distribute frames of the TCP session from a link that is failed to another link within the multiple links. With such an implementation, the TCP session will not be broken nor need re-establishment.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 15:
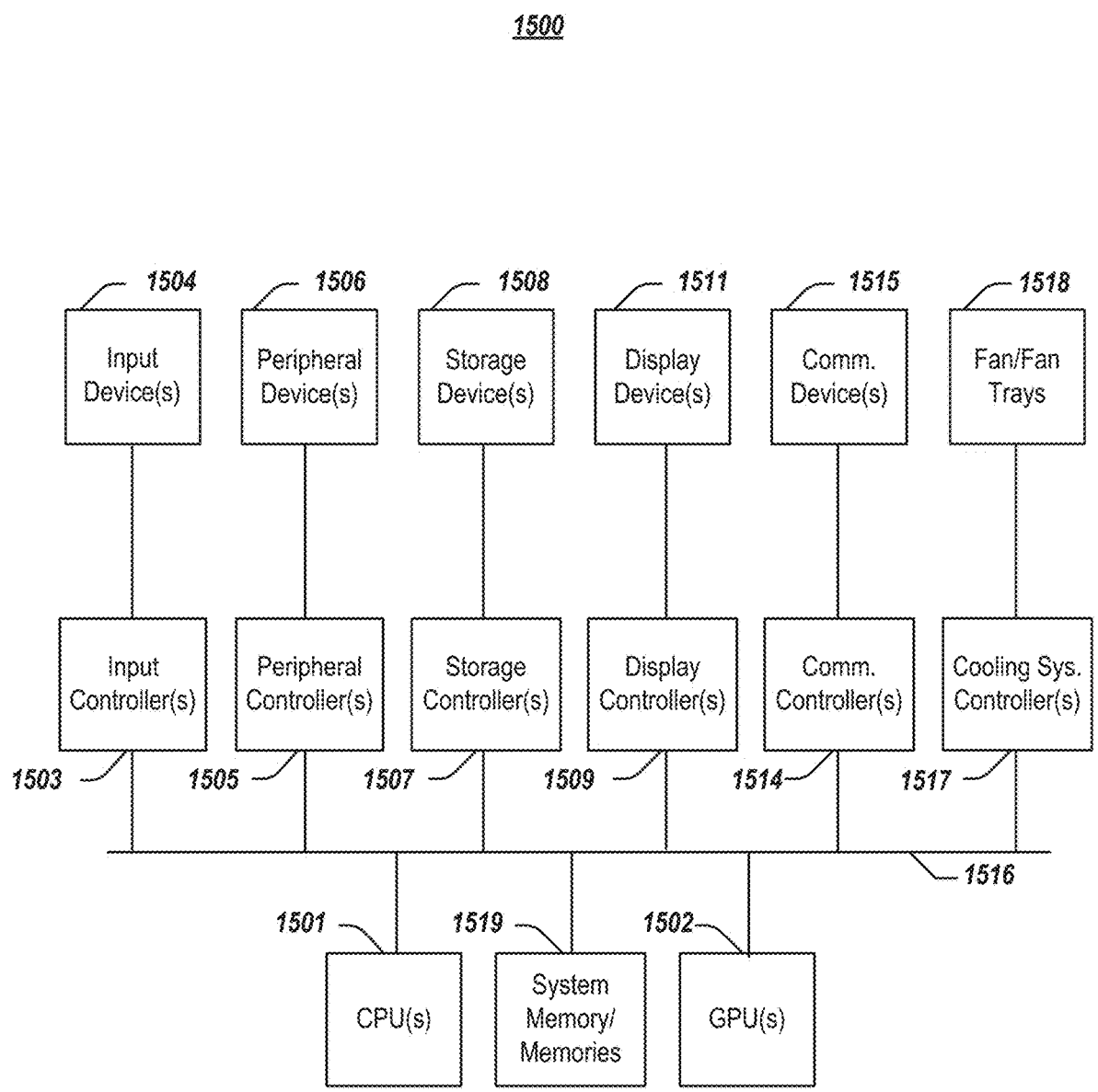
FIG. 15 depicts a simplified block diagram of an information handling system, according to embodiments of the present disclosure.

FIG. 15 depicts a simplified block diagram of an information handling system (or computing system), according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more CPUs 1501 that provides computing resources and controls the computer. CPU 1501 may be implemented with a microprocessor/processor or the like and may also include one or more graphics processing units (GPU) 1502 and/or a floating-point coprocessor for mathematical computations. In one or more embodiments, one or more GPUs 1502 may be incorporated within the display controller 1509, such as part of a graphics card or cards. The system 1500 may also include a system memory 1519, which may comprise RAM, ROM, or both.

A number of controllers and peripheral devices may also be provided, as shown in FIG. 15. An input controller 1503 represents an interface to various input device(s) 1504, such as a keyboard, mouse, touchscreen, stylus, microphone, camera, trackpad, display, etc. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT) display, a thin film transistor (TFT) display, organic light-emitting diode, electroluminescent panel, plasma panel, or any other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fibre Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1500 comprises one or more fans or fan trays 1518 and a cooling subsystem controller or controllers 1517 that monitors thermal temperature(s) of the system 1500 (or components thereof) and operates the fans/fan trays 1518 to help regulate the temperature.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 16:
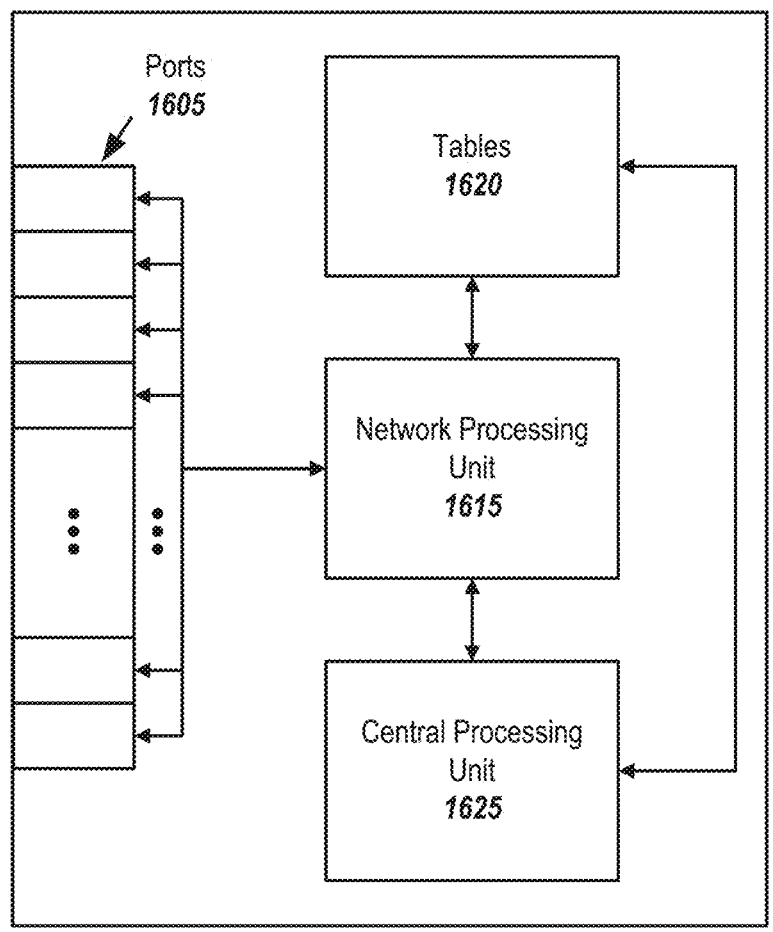
FIG. 16 depicts an alternative block diagram of an information handling system, according to embodiments of the present disclosure.

FIG. 16 depicts an alternative block diagram of an information handling system, according to embodiments of the present disclosure. It will be understood that the functionalities shown for system 1600 may operate to support various embodiments of the present disclosure—although it shall be understood that such system may be differently configured and include different components, additional components, or fewer components.

The information handling system 1600 may include a plurality of I/O ports 1605, a network processing unit (NPU) 1615, one or more tables 1620, and a CPU 1625. The system includes a power supply (not shown) and may also include other components, which are not shown for sake of simplicity.

In one or more embodiments, the I/O ports 1605 may be connected via one or more cables to one or more other network devices or clients. The network processing unit 1615 may use information included in the network data received at the node 1600, as well as information stored in the tables 1620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for implementing multi-host link aggregation group (LAG), the method comprising:
given an active-active cluster comprising a plurality of hosts with each host having an agent, performing steps comprising:
assigning an agent on a host among the plurality of hosts as a primary agent;
setting one or more agents on one or more hosts other than the host where the primary agent resides as normal agents;
setting, by the primary agent, a bond Media Access Control (MAC) address for a multi-host link aggregation group (LAG) bond for the plurality of hosts to a MAC address of a local port of the host;
exchanging information between the primary agent and the normal agents; and
creating a service IP (Internet Protocol) address for all hosts in the multi-host LAG bond, the service IP address is a virtual IP address for the bond MAC address.

2. The processor-implemented method of claim 1 wherein the active-active cluster utilizes Link Aggregation Control Protocol (LACP) bond frame distribution mechanisms to perform load balancing among the plurality of hosts.

3. The processor-implemented method of claim 1 wherein each host has a single link or multiple links to a network switch.

4. The processor-implemented method of claim 1 wherein the step of exchanging information between the primary agent and the normal agents comprises steps of:
initiating, by the primary agent, a local bond member table for the primary agent comprising one or more networking information;
initiating, by the primary agent, a remote bond member table for the primary agent, which is an empty table upon initialization;
sending, from the primary agent, a query request comprising the bond MAC address to all normal agents; and
updating, by the primary agent, the remote bond member table for the primary agent based on query responses received from one or more normal agents.

5. The processor-implemented method of claim 4 wherein the step of exchanging information between the primary agent and the normal agents comprises steps of:
initiating, by each of the normal agents, a remote bond member table for each normal agent, which is an empty table upon initialization;
upon receiving the query request from the primary agent, changing, by each of the normal agents, a MAC address of a local link to the bond MAC address;
initiating, by each of the normal agents, a local bond member table for each normal agent comprising one or more networking information; and
sending, from each of the normal agents to the primary agent, a query response comprising a local bond member status.

6. The processor-implemented method of claim 1 wherein the hosts of the plurality of hosts are interconnected by a management network, which causes the multi-host LAG bond in the active-active cluster to be created.

7. The processor-implemented method of claim 1 wherein:
responsive to an Address Resolution Protocol (ARP) request being sent from a client served by the active-active cluster, a single host among the plurality of hosts in the multi-host LAG bond receives and responds to the ARP request.

8. The processor-implemented method of claim 1 further comprising:
performing steps of initializing a Transmission Control Protocol (TCP) session comprising:
receiving, at a port on a network switch coupled to the multi-host LAG bond, a TCP synchronization (SYN) packet from a client by the active-active cluster, the TCP SYN packet comprises a destination MAC address that is the bond MAC address, a source MAC address that is the MAC address of the client, a destination IP address that is the virtual IP, and a source IP address that is the IP address of the client;
forwarding, by the network switch, the TCP SYN packet to a port channel;

distributing, by a port channel aggregator on the network switch, the TCP SYN packet to a link;
receiving, at a host connected to the link, the TCP SYN packet;
sending, by the host connected to the link, a TCP SYN acknowledgement (ACK) packet to the client, the TCP SYN ACK packet comprises a destination MAC address that is the MAC address of the client, a source MAC address that is the bond MAC address, a destination IP address that is the IP address of the client, and a source IP address that is the virtual IP address;
sending, by the client, a TCP ACK packet; and
distributing, by a port channel aggregator on the network switch, the TCP ACK packet to the link.

9. A non-transitory computer-readable medium or media comprising one or more sequences of instructions which, when executed by at least one processor, causes steps to be performed comprising:
assigning an agent, among a plurality of agents with an agent installed on each of a plurality of hosts in an active-active cluster, on a host among the plurality of hosts as a primary agent;
setting one or more agents, among the plurality of agents, other than the primary agent as normal agents;
setting a bond Media Access Control (MAC) address for a multi-host link aggregation group (LAG) bond for the plurality of hosts to a MAC address of a local port of the host where the primary agent resides;
exchanging information between the primary agent and the one or more normal agents; and
creating a service IP (Internet Protocol) address for all hosts in the multi-host LAG bond, the service IP address is a virtual IP address for the bond MAC address.

10. The non-transitory computer-readable medium or media of claim 9 wherein the steps further comprise:
utilizing Link Aggregation Control Protocol (LACP) bond frame distribution mechanisms to perform load balancing among the plurality of hosts.

11. The non-transitory computer-readable medium or media of claim 9 wherein the step of exchanging information between the primary agent and the normal agents comprises steps of:
initiating, by the primary agent, a local bond member table for the primary agent comprising one or more networking information;
initiating, by the primary agent, a remote bond member table for the primary agent, which is an empty table upon initialization;
sending, from the primary agent, a query request comprising the bond MAC address to all normal agents; and
updating, by the primary agent, the remote bond member table for the primary agent based on query responses received from one or more normal agents.

12. The non-transitory computer-readable medium or media of claim 11 wherein the step of exchanging information between the primary agent and the normal agents further comprises steps of:
initiating, by each normal agent, a remote bond member table for the normal agent, which is an empty table upon initialization;
upon receiving the query request from the primary agent, changing, by the normal agent, a MAC address of a local link to the bond MAC address;
initiating, by the normal agent, a local bond member table for the normal agent comprising one or more networking information; and
sending, from the normal agent to the primary agent, a query response comprising a local bond member status.

13. The non-transitory computer-readable medium or media of claim 9 wherein the steps further comprise:
responsive to an Address Resolution Protocol (ARP) request sent from a client served by the active-active cluster, a single host among the plurality of hosts in the multi-host LAG bond receiving and responding to the ARP request.

14. The non-transitory computer-readable medium or media of claim 9 wherein the steps further comprise:
initializing a Transmission Control Protocol (TCP) session using steps comprising:
receiving, at a port on a network switch coupled to the multi-host LAG bond, a TCP synchronization (SYN) packet from a client by the active-active cluster, the TCP SYN packet comprises a destination MAC address that is the bond MAC address, a source MAC address that is the MAC address of the client, a destination IP address that is the virtual IP, and a source IP address that is the IP address of the client;
forwarding, by the network switch, the TCP SYN packet to a port channel;
distributing, by a port channel aggregator on the network switch, the TCP SYN packet to a link;
receiving, at a host connected to the link, the TCP SYN packet;
sending, by the host connected to the link, a TCP SYN acknowledgement (ACK) packet to the client, the TCP SYN ACK packet comprises a destination MAC address that is the MAC address of the client, a source MAC address that is the bond MAC address, a destination IP address that is the IP address of the client, and a source IP address that is the virtual IP address;
sending, by the client, a TCP ACK packet; and
distributing, by a port channel aggregator on the network switch, the TCP ACK packet to the link.

15. An active-active cluster comprising:
a plurality of hosts; and
a plurality of agents with an agent installed on each of the plurality of hosts, one agent among the plurality of agents is designated as a primary agent, other agents among the plurality of agents are set as normal agents, wherein the plurality of agents are configured for:
setting, by the primary agent, a bond Media Access Control (MAC) address for a multi-host link aggregation group (LAG) bond for the plurality of hosts to a MAC address of a local port of the host; and
exchanging information between the primary agent and the normal agents;
wherein the plurality of hosts in the multi-host LAG bond share a service IP address that is a virtual IP address for the bond MAC address.

16. The active-active cluster of claim 15 wherein the active-active cluster utilizes Link Aggregation Control Protocol (LACP) bond frame distribution mechanisms to perform load balancing among the plurality of hosts.

17. The active-active cluster of claim 15 wherein each of the plurality of hosts has a single link or multiple links to a network switch.

18. The active-active cluster of claim 15 wherein:
responsive to an Address Resolution Protocol (ARP) request sent from a client served by the active-active cluster, a single host among the plurality of hosts in the multi-host LAG bond receiving and responding to the ARP request.

19. The active-active cluster of claim 15 wherein:
the plurality of hosts are interconnected by a management network, which causes the multi-host LAG bond in the active-active cluster to be created.

20. The active-active cluster of claim 15 wherein the active-active cluster is configured to initialize a Transmission Control Protocol (TCP) session using steps comprising:
receiving, at a port on a network switch coupled to the multi-host LAG bond, a TCP synchronization (SYN) packet from a client by the active-active cluster, the TCP SYN packet comprises a destination MAC address that is the bond MAC address, a source MAC address that is the MAC address of the client, a destination IP address that is the virtual IP, and a source IP address that is the IP address of the client;
forwarding, by the network switch, the TCP SYN packet to a port channel;
distributing, by a port channel aggregator on the network switch, the TCP SYN packet to a link;
receiving, at a host connected to the link, the TCP SYN packet;
sending, by the host connected to the link, a TCP SYN acknowledgement (ACK) packet to the client, the TCP SYN ACK packet comprises a destination MAC address that is the MAC address of the client, a source MAC address that is the bond MAC address, a destination IP address that is the IP address of the client, and a source IP address that is the virtual IP address;
sending, by the client, a TCP ACK packet; and
distributing, by a port channel aggregator on the network switch, the TCP ACK packet to the link.

* * * * *